United States Patent [19]
Tobita et al.

[11] Patent Number: 5,257,546
[45] Date of Patent: Nov. 2, 1993

[54] PRESSURE MEASURING SENSOR

[75] Inventors: Tomoyuki Tobita; Akira Sase, both of Katsuta, Japan

[73] Assignee: Hitachi, Ltd., Chiyoda, Japan

[21] Appl. No.: 703,847

[22] Filed: May 21, 1991

[30] Foreign Application Priority Data

May 21, 1990 [JP] Japan .................................. 2-131083

[51] Int. Cl.⁵ .............................. G01L 7/08; G01L 9/06
[52] U.S. Cl. ......................................... 73/727; 73/721; 338/4
[58] Field of Search ................. 73/708, 720, 721, 726, 73/727, DIG. 4; 338/4, 42

[56] References Cited

U.S. PATENT DOCUMENTS 3,335,381 8/1967 Di Giovanni .......................... 338/4
4,102,210 7/1978 Couston et al. ........................ 338/4

Primary Examiner—Donald O. Woodiel
Attorney, Agent, or Firm—Antonelli, Terry, Stout & Kraus

[57] ABSTRACT

There is provided a pressure measuring sensor having a diaphragm including a peripheral fixing portion so formed as to be fixed to a pressure measuring sensor proper and be thick, a pressure receiving portion responsive to a pressure to be measured to move, and a strain causing portion responsive to the movement of the pressure receiving portion to cause strain, the pressure receiving portion having a shape so formed as to substantially perform the same function as a member having a high rigidity when moving in response to a change in the above described pressure to be measured, and the strain causing portion being substantially subject to bending stress in response to the movement of the pressure receiving portion moved according to the change in the above described pressure to be measured and thereby the strain causing portion providing a plurality of gauge resistors formed on the strain causing portion with tensile stress or compressive stress proportionate to the pressure to be measured.

9 Claims, 2 Drawing Sheets

PRESSURE MEASURING SENSOR

BACKGROUND OF THE INVENTION

The present invention relates to a pressure measuring sensor, and in particular to a pressure measuring sensor for sensing the movement of a diaphragm responsive to a pressure difference between both sides thereof and measuring a pressure or a differential pressure applied to that diaphragm.

In the prior art, such a pressure measuring sensor has a thin diaphragm in the central part thereof, and a gauge resistor for sensing a stress of the diaphragm caused by a pressure applied to the diaphragm is formed on one of the faces of the peripheral part of that diaphragm. No matter which side of the diaphragm a pressure is applied to, the stress applied to the gauge resistor mainly comprises a tensile force because of deflection of the diaphragm caused by the pressure. That is to say, while the pressure is small, a tensile force acts in one direction and a compressive force acts in the other direction. As the pressure is further increased, however, the tensile force acting in one direction becomes further large, and the compressive force acting in the other direction gradually changes into a tensile force. This results in a disadvantage that the output characteristic obtained from the gauge resistor varies according to the direction of the diaphragm deflection.

As the prior art in which the above described disadvantage is mitigated, a pressure measuring sensor as disclosed in JP-A-51-69678 can be mentioned. The pressure measuring sensor has a diaphragm comprising a semiconductor such as silicon. The diaphragm has a central part so formed as to be thick and a peripheral part so formed as to be thin and form a strain causing portion which is deformed in response to a pressure applied to the diaphragm. In this case, the thin part has gauge resistors formed by using the diffusion method or the ion implantation method. In such a pressure measuring sensor, vertical bending stress acts upon the strain causing portion in the direction of pressure application. Therefore, a tensile force acts upon gauge resistors in response to one force whereas a compressive force acts upon gauge resistors in response to the other force. Even if directions of pressure application to the diaphragm are different, therefore, nearly the same output characteristics with respect to the both directions, i.e., nearly symmetrical regular and reverse characteristics can be obtained.

If the strain causing portion is so formed as to be sufficiently thin with the object of measuring a low pressure in a pressure measuring sensor having the above described configuration, however, a tensile force predominantly acts upon gauge resistors in response to pressures in both directions in the same way as the first cited example of the prior art in which the entire diaphragm is so formed as to be thin, resulting in degraded linearity of output characteristics of gauge resistors.

In attempting to reduce the size of a pressure measuring sensor, the strain causing portion also becomes small in the nature of things. For securing an output not less than a predetermined level, the thickness of the strain causing portion in the diaphragm must be made further thinner. In this case, however, the above described drawback appears further largely. In the past, therefore, miniaturization was difficult as a matter of fact.

SUMMARY OF THE INVENTION

An object of the present invention is to provide a pressure measuring sensor having excellent linearity even in a measuring region of low pressure or low pressure difference and excellent symmetry in regular and reverse characteristics.

In a pressure measuring sensor according to the present invention, a diaphragm responsive to the pressure comprises a peripheral part so formed as to be thick and be fixed to a support member, an annular thin strain causing portion having a plurality of gauge resistors formed therein, a wiring part for electrically interconnecting the plurality of gauge resistors, and a central part having such a high rigidity effect that bending stress mainly acts upon the strain causing portion with tensile stress reduced to the utmost in response to deformation of the diaphragm based upon a change in pressure to be measured.

By thus providing the central part with a high rigidity effect, the strain causing portion formed around the central part can be made to function as a cantilever beam. Therefore, deformation caused in the strain causing portion is mainly caused by the bending function. As a result, the gauge resistors are subject to compressive force in response to one pressure and subject to tensile force in response to the other pressure. Therefore, output characteristics having symmetrical regular and reverse characteristics can be obtained.

DESCRIPTION OF THE PREFERRED EMBODIMENTS

Embodiments of the present invention will hereafter be described by referring to accompanying drawings.

Figure 1:
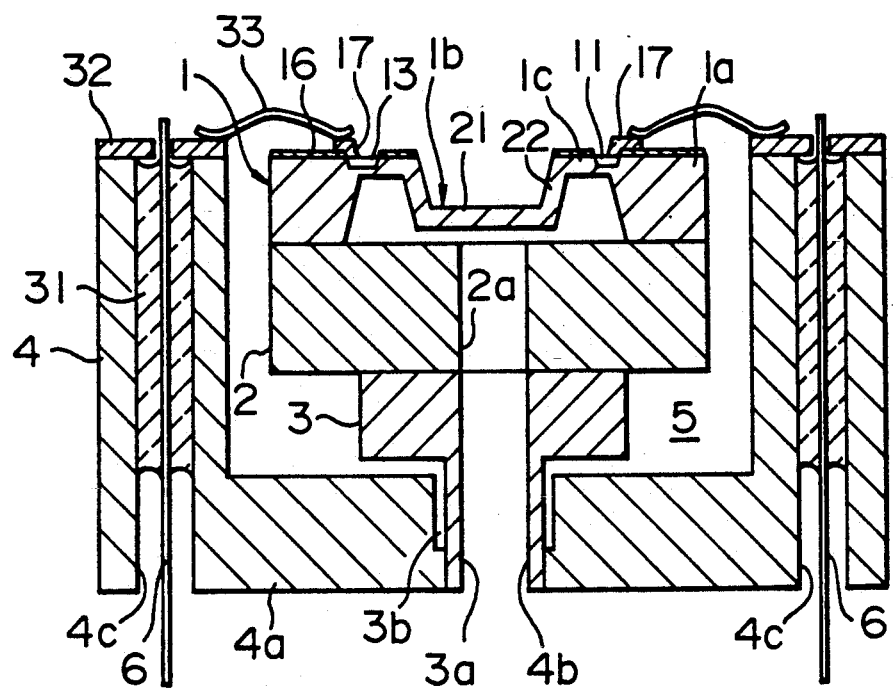
FIG. 1 is a longitudinal sectional view of a pressure/differential presure detector having a measuring diaphragm according to the present invention.
Figure 2:
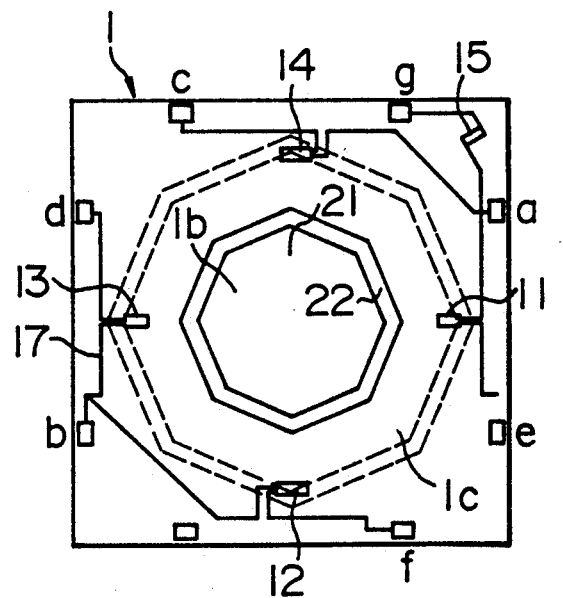
FIG. 2 is a top view of a measuring diaphragm.
Figure 3:
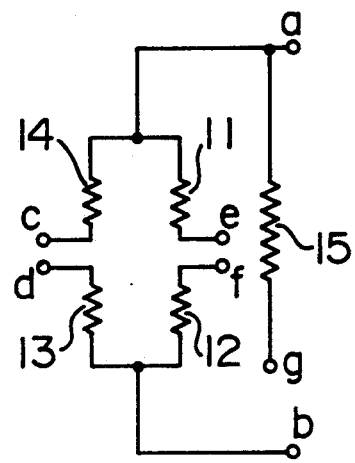
FIG. 3 is an electric wiring diagram.

FIG. 1 is a longitudinal sectional view of a pressure measuring sensor according to the present invention. FIG. 2 is a top view of a measuring diaphragm. FIG. 3 is a wiring configuration diagram. With reference to FIG. 1, numeral 1 denotes a diaphragm for measuring a pressure or a differential pressure formed by monocrystalline silicon. The diaphragm 1 is attached to a housing 4 via a first support member 2 having a hole 2a in the axial portion thereof and a second support member 3 having a similar hole 3a. That is to say, the diaphragm 1 is fixed to the top face of the first support member 2. The second support member 3 is attached to the bottom face of the first support member 2. The axial holes 2a and 3a respectively of the support members 2 and 3 are disposed coaxially.

The housing 4 has a comparatively large space 5, which is largely open upward, in the central part thereof. The housing 4 has a bottom part 4a comprising a hole 4b formed therein. The bottom end of the bottom projection 3b of the second support member 3 is fitted in the hole 4b and is fixed by welding or the like. An assembly comprising the diaphragm 1, the first support member 2 and the second support member 3 is so disposed as to be housed into the space 5 of the above described housing 4. In a plurality of portions of the peripheral portion of the housing 4, through-holes 4c for passing leads 6 are formed in the vertical direction.

Considering thermal strain caused by electrical insulation between the diaphragm 1 and the housing 4 for measuring the pressure or differential pressure and by a difference in coefficient of linear expansion between them, it is desirable that the above described first support member 2 comprises borosilicate glass having a coefficient of linear expansion approximated to that of silicon forming the diaphragm 1. Considering the coefficient of linear expansion and mounting to the housing 4 by means of welding joining or the like, it is desirable that the second support member 3 is formed by using a Fe-Ni alloy or a Fe-Ni-Co alloy having a coefficient of linear expansion approximated to that of silicon. If the first support member 2 and the second support member 3 are formed by using the materials heretofore described, the diaphragm 1, the first support member 2 and the second support member 3 can be joined by using an anode joining method. Thereby the assembly as shown in FIG. 1 can be fabricated.

As the material forming the diaphragm 1 for measuring a pressure or differential pressure, n-type monocrystalline silicon of the (100) plane is used. A thick fixing portion 1a is formed in the fringe portion of the diaphragm 1. In the central part of the diaphragm 1, a recess portion 1b is formed on the side whereon gauge resistors are to be formed. On the peripheral side of the recess portion 1b inside of the fixing portion 1a, an annular groove opened downward is formed to provide the thin strain causing portion 1c. The diaphragm 1 is fixed to the first support member 2 by the fixing portion 1a. The recess portion 1b has an opening opened upward in FIG. 1 and is so formed as to be projected downward in FIG. 1, i.e., projected on the side whereon the first support member 2 is disposed. On the upper face of the strain causing portion 1c annually formed, p-type gauge resistors 11-14 are formed in directions respectively parallel to or perpendicular to the direction of the <110> axis indicating the maximum sensitivity of the piezoresistance coefficient in the (100) plane as shown in FIG. 2. In the illustrated example, four gauge resistors are formed. As the method for forming gauge resistor, the diffusion method or the ion implantation method is used. It is desirable that the gauge resistors 11-14 on the top face of the strain causing portion 1c are disposed near the fixing portion 1a of the strain causing portion. Because the gauge resistors are so disposed as to maximize the strain caused in the radial direction and the circumference direction in the strain causing portion when a pressure or a differential pressure is applied thereto.

As shown in FIG. 3, the above described four gauge resistors 11-14 are so electrically connected as to form a Wheatstone bridge and generate a differential electrical output. Numeral 15 shown in FIGS. 2 and 3 denotes a gauge resistor. This gauge resistor 15 is a thermo-sensitive resistor disposed in parallel to the direction of the <100> axis indicating the minimum sensitivity of the piezoresistance coefficient in the (100) plane. By using this thermo-sensitive resistor 15, information relating to the environmental temperature around the diaphragm 1 can be obtained. On the top face of the diaphragm 1, an oxide film 16 for guarding the gauge resistors 11-15, aluminum winding 17 for connecting the gauge resistors 11-15 to yield a wiring structure as shown in FIG. 3, and bonding pads a-g are formed.

As shown in FIG. 2, the plane shape of the diaphragm 1 for measuring the pressure or the differential pressure is a square, for example. In the central part of the diaphragm 1, the recess portion 1b having a plane shape of an octagon, for example, is formed. This recess portion 1b comprises a base portion 21 and an annular side wall plate portion 22. As an example in this embodiment, the base plate portion 21 is formed in parallel to the top face of the diaphragm 1, and the side wall plate portion 22 is so formed as to be slant. By forming the recess portion 1b in the diaphragm 1, the central part of the diaphragm 1 projects downward as shown in FIG. 1. The side wall plate portion 22 forming the recess portion 1b is so formed that the thickness of the side wall plate portion 22 may be equivalent to or larger than that of the strain causing portion 1c. The thickness of the base plate portion 21 can also be defined in the same way as the side wall plate portion 22. As heretofore described, the recess portion 1b, which comprises the base plate portion 21 and the side wall plate portion 22 and which is depressed downward in FIG. 1, is formed in the diaphragm 1. Therefore, the diaphragm 1 is so formed that its shape may be symmetric with respect to the center axis line and the pressure receiving characteristics may be symmetric with respect to pressures applied from above and from the bottom. Since the diaphragm 1 is so formed that such a recess portion 1b may be disposed in the central part thereof, this recess portion 1b has a high rigidity as compared with the annular strain causing portion 1c surrounding the recess portion 1b. As a result, the strain causing portion 1c functions as a beam which is subject to load force in the center axis line direction of the recess portion 1b. That is to say, when a pressure or a differential pressure is applied to the diaphragm 1, strain is caused in the diaphragm 1, but bending strain is caused between the side wall plate portion 22 and the base plate 21 of the recess portion 1b or between the side wall plate 22 and the strain causing portion 1c. As a result of this bending strain, tensile force does not act upon the strain causing portion 1c so largely and bending strain is caused in most cases.

In the above described action of the diaphragm 1, reaction force balancing the force given by the product of a pressure P and a pressure receiving area S of the diaphragm 1 is dominated by the reaction force of the strain causing portion 1c. Even if the thickness of the base plate portion 21 and the side wall plate portion 22 of the recess portion 1b changes, therefore, strain generated in the strain causing portion 1c scarcely changes so long as the thickness of the strain causing portion 1c is equivalent to or smaller than the thickness of the base plate portion 21 and the side wall plate portion 22. That is to say, it becomes a proviso that the thickness of the base plate portion 21 and the side wall portion 22 is equivalent to or larger than the thickness of the strain causing portion 1c. Further, the recess portion 1b comprising the side wall plate portion 22 and the base plate portion 21 forms a boundary portion between it and the thick fixing portion 1a in the strain causing portion 1c.

As the thickness of the strain causing portion 1c becomes thinner, membrane stress, i.e., tensile force generated in the strain causing portion Ic of the diaphragm 1 generally becomes large. In the strain causing portion Ic of the diaphragm having the configuration of the present embodiment, however, its membrane stress is reduced by an amount equivalent to an increase of bending strain acting between the side wall plate 22 and the base plate 21 or between the side wall plate 22 and the strain causing portion 1c. In the diaphragm 1, the recess portion 1b does not have a shape continuously extended from the strain causing portion 1c, and the strain of the recess portion 1b and the stress of the stress causing portion 1c occur separately each other. Viewing the strain action of the diaphragm 1 from the strain action of the strain causing portion 1c, the central part comprising the recess portion 1b functions as a high rigidity portion. Therefore, the strain causing portion 1c serves as a cantilever beam having a high rigidity portion in the central part. As a result, the membrane stress acting upon the strain causing portion 1c is very small and can be neglected. Only the bending stress thus acts upon the strain causing portion 1c.

As heretofore described, the recess portion 1b having high rigidity is disposed in the central part of the diagram 1 according to the present embodiment. In case a pressure of regular (upward) direction is applied to the diaphragm 1, therefore, compressive force proportionate to that pressure acts upon the gauge resistors 11-14. Further, in case a pressure of reverse (downward) direction is applied to the diaphragm 1, tensile force proportionate to that pressure acts upon the gauge resistors 11-14. In response to regular and reverse pressures, completely symmetric strains thus occur in the strain causing portion 1c. As a result, a diaphragm having excellent regular and reverse characteristics can be obtained.

When the diaphragm 1 according to the present embodiment is viewed from another angle, the structural continuum comprising the strain causing portion 1c, the side wall plate portion 22 and the base plate portion 21 can be regarded as corrugated partitions having respective boundaries as fulcrums. Deformation of the diaphragm 1 and strain generated in the diaphragm 1 do not depend upon the direction of pressure application. In the relation between pressure and output of the diaphragm 1, linearity can be sufficiently secured.

The diaphragm 1 having the above described shape is worked and formed typically by wet etching or dry etching. In this forming method, a planar diaphragm material is first taken and the bottom face of the diaphragm is so etched by using a predetermined mask as to leave the fixing portion 1a and the central part. A portion corresponding to the annular strain causing portion 1c is thus formed. With a predetermined mask on the fixing portion 1a and the strain causing portion 1c, the diaphragm is then etched so as to leave the above described side wall plate portion 22 and the base plate portion 21, the recess portion 1b being thus formed. As masks for etching, photoresist films or oxide films, for example, are used. Further, in the above described example, etching processes of the top face and the bottom face of the diaphragm 1 shown in FIG. 1 are separately performed. However, those processes may be simultaneously performed. If the high rigidity portion is formed by forming the recess portion in the central portion of the diaphragm 1 as heretofore described, facilities substantially identical with conventional facilities for manufacturing diaphragms can be used and cost problems in fabrication are not posed.

Further, in the diaphragm 1 as shown in FIG. 2, aluminum wiring 17 is not arranged in the strain causing portion 1c and the recess portion 1b, which is a high rigidity portion located at the center, at all, but arranged only in the peripheral fixing portion 1a. Firstly, this aims at reducing the number of processes by eliminating the process for forming wiring after the recess portion 1b has been formed. Secondly, this aims at preventing the strain causing portion 1c and the recess portion 1b, in which large strain is caused when a pressure is applied and the strain largely changes according to a change in environmental temperature, from exerting a bad influence upon aluminum wiring. By thus disposing the aluminum wiring 17 on the fixing portion 1a of the diaphragm 1, the aluminum wiring can be made free from an influence of high strain generated when a pressure is applied and thermal strain (difference in coefficient of linear expansion between silicon and aluminum) generated when the temperature has changed.

In the through-hole 4c of the housing 4, a hermetic seal 31 is placed and a lead 6 is disposed therein. The upper end and lower end of the lead 6 are pulled out outside of the through-hole 4c. In a predetermined position of the top face of the housing 4, a wiring plate 32 is disposed and connected to the lead 6. Further, the wiring plate 32 is connected to the above described aluminum wiring 17 corresponding thereto via a lead 33. Thereby the electric signal relating to the pressure detected by the gauge resistors 11-14 can be taken out to the leads 6.

The pressure of a fluid to be measured is applied to at least one of the top face and the bottom face of the diaphragm 1 having the above described configuration as shown in FIG. 1. As a result, an electrical signal corresponding to that pressure or differential pressure can be obtained. In order to prevent the fluid to be measured from directly coming in contact with the top face and the bottom face of the measuring diaphragm 1, a partition such as a seal diaphragm filled with sealing liquid therein may be disposed.

Figure 4:
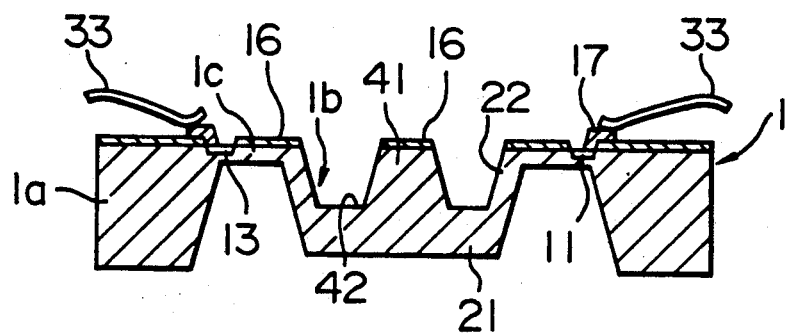
FIGS. 4 to 6 are longitudinal sectional views showing embodiments of a change in measuring diaphragm.

FIG. 4 shows a second embodiment of the present invention. In the diaphragm 1 according to this embodiment, the base plate portion 21 of the recess portion 1b formed in the central part has a convex portion 41 taking the sectional shape of a trapezoid, for example. The convex portion 41 is formed by making the thickness of the base plate portion 21 large. Therefore, an annular groove 42 is formed around the convex portion 41 in the recess portion 1b. The remaining configuration is identical with that of the diaphragm shown in FIG. 1. In FIG. 4, structural portions other than the diaphragm 1 are omitted.

Figure 5:
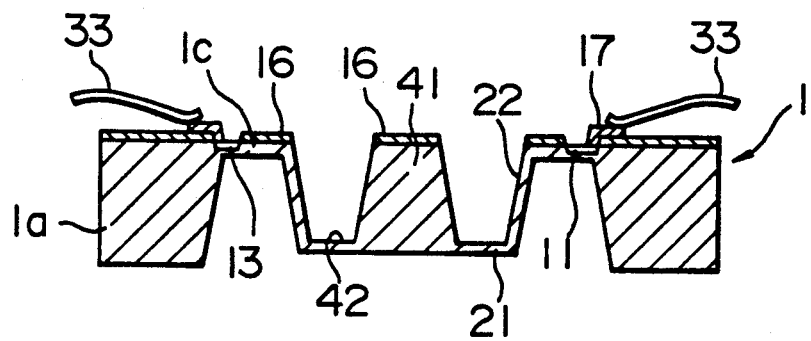

FIG. 5 shows a third embodiment of the present invention. The diaphragm 1 in this embodiment has the same structure as that of the above described second embodiment, except that the thickness of the side wall plate portion 22 and the base plate portion 21 forming the recess portion 1b and the thickness of the strain causing portion 1c are made thin.

Even in diaphragms of the second embodiment and the third embodiment having the above described configurations, the bending action caused between the side wall portion 22 and the base plate portion 21 and between the side wall portion 22 and the strain causing portion 1c generates mainly bending stress in the strain causing portion 1c instead of tensile stress. As a result, a technical effect similar to that of the first embodiment is exhibited.

Figure 6:
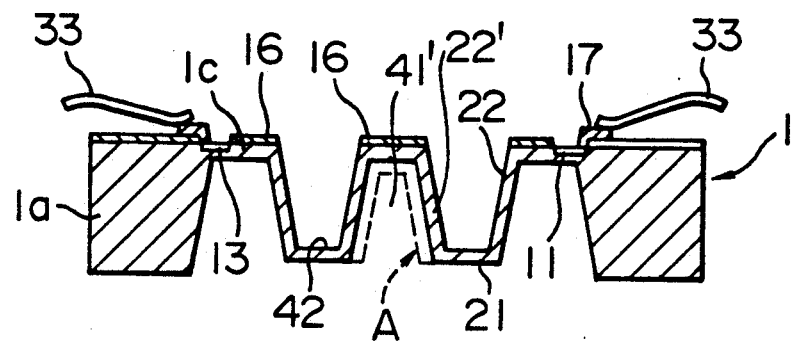

FIG. 6 shows a fourth embodiment of the present invention. In contrast with the second and third embodiments respectively shown in FIGS. 4 and 5, a hollow portion 41' opened downward is formed in the convex portion 41 and a shape bending portion 22' is provided. Preferably the thickness of this shape bending portion 22' is equivalent to or larger than the thickness of the strain cousing portion 1c. FIG. 6 shows an embodiment so as to correspond to FIG. 5. A broken line A in FIG. 6 represents the thickness of the shape bending portion 22' in case an embodiment corresponding to FIG. 4 is formed.

In the embodiment shown in FIG. 6, the shape bending portions 22 and 22' are formed doubly, i.e., in a corrugated form. In the strain causing portion 1c, therefore, the membrane stress responsive to the pressure change is largely reduced. Virtually only the bending stress is thus caused. As a result, regular and reverse output characteristics which are symmetric can be obtained. Further, since the central part is hollow, the mass is reduced and hence the natural frequency can be made high. Therefore, differential pressure instrumentation responsive to a pressure change containing high frequency components can be performed.

In accordance with the present invention as evident from the description heretofore made, the central part of the diaphragm is provided with a predetermined shape change to form a high rigidity portion and a strain causing portion is provided around the high rigidity portion. Even if the thickness of the strain causing portion is made thin, therefore, a sufficiently high detection output can be obtained and the strain caused in the strain causing portion can be mainly composed of bending. As a result, the linearity of detection characteristics is improved and regular and reverse characteristics become excellent. Thereby even the pressure in the low region can be detected with high precision. By forming a recess portion in the diaphragm, the pressure receiving area substantially becomes large. On the contrary, the same sensitivity can be obtained even if the measuring diaphragm is reduced in size as compared with the prior art, resulting in an advantage.

We claim:

1. A pressure measuring sensor including a pressure measuring sensor proper; a diaphragm having a peripheral fixing portion so formed as to be fixed to said sensor proper and be thick, a pressure receiving portion responsive to a pressure to be measured to move, and a strain causing portion so fixed to said peripheral fixing portion was to be responsive to the movement of said pressure receiving portion to cause strain; a plurality of gauge resistors disposed on said strain causing portion; and a circuit for electrically connecting sid gauge resistors and outputting an electric signal proportionate to said pressure to be measured, said pressure measuring sensor comprising:

said pressure receiving portion having a shape so formed as to substantially perform the same function as a member having a high rigidity when moving in response to a change in said pressure to be measured; and said strain causing portion being substantially subject to bending stress in response to the movement of said pressure receiving portion moved according to the change in said pressure to be measured and thereby said strain causing portion providing said plurality of gauge resistors with tensile stress or compressive stress proportionate to said pressure to be measured;

wherein wiring forming a part of said circuit and connected to said gauge resistors is disposed on said peripheral fixing portion;

wherein said pressure receiving portion comprises a side wall plate portion fixed to said strain causing portion and formed so as to be substantially annular and a base plate portion fixed to said side wall plate portion and forming a recess shape in conjunction with said side wall plate portion; and wherein said side wall plate portion is so formed as to be funnel-shaped.

2. A pressure measuring sensor according to elaim 1, wherein each of said side wall plate portion and said base plate portion has a thickness equivalent to or larger than that of said strain causing portion.

3. A pressure measuring sensor according to claim 1, wherein said pressure receiving portion is so formed as to protrude on the side whereon said peripheral fixing portion is so formed as to be thick.

4. A pressure measuring sensor according to claim 1, wherein said strain causing portion is formed by disposing a substantially annular groove portion on the periphery side of said side wall plate portion.

5. A pressure measuring sensor according to claim 1, wherein said sensor proper comprises:

a cup-shaped housing having an open end on side and a through-hole in the center of the bottom portion thereof; and support members having, in the center thereof, through-holes communicating with said through-hole and fixing and holding said peripheral fixing pertion.

6. A pressure measuring sensor according to claim 1, wherein a thick portion is formed in the central part of said base plate portion.

7. A pressure measuring sensor according to claim 6, wherein said central thick portion is provided by forming a substantially annular groove inside of said side wall plate portion.

8. A pressure measuring sensor according to claim 1, wherein said pressure receiving portion comprises a plurality of side wall plate portions formed in a corrugated form.

9. A pressure measuring sensor according to claim 8, wherein said pressure receiving portion comprises a first side wall plate portion fixed on one side to said strain causing portion and formed so as to be substantially annular, a base plate portion having one end fixed to the other end of said first side wall plate portion, a second side wall plate portion having one end fixed to an inner end of said base plate portion, and a thin central part provided in said second side wall plate portion.

* * * * *